(No Model.)
E. R. WHITNEY.
DYNAMO ELECTRIC MACHINE.
No. 322,230. Patented July 14, 1885.
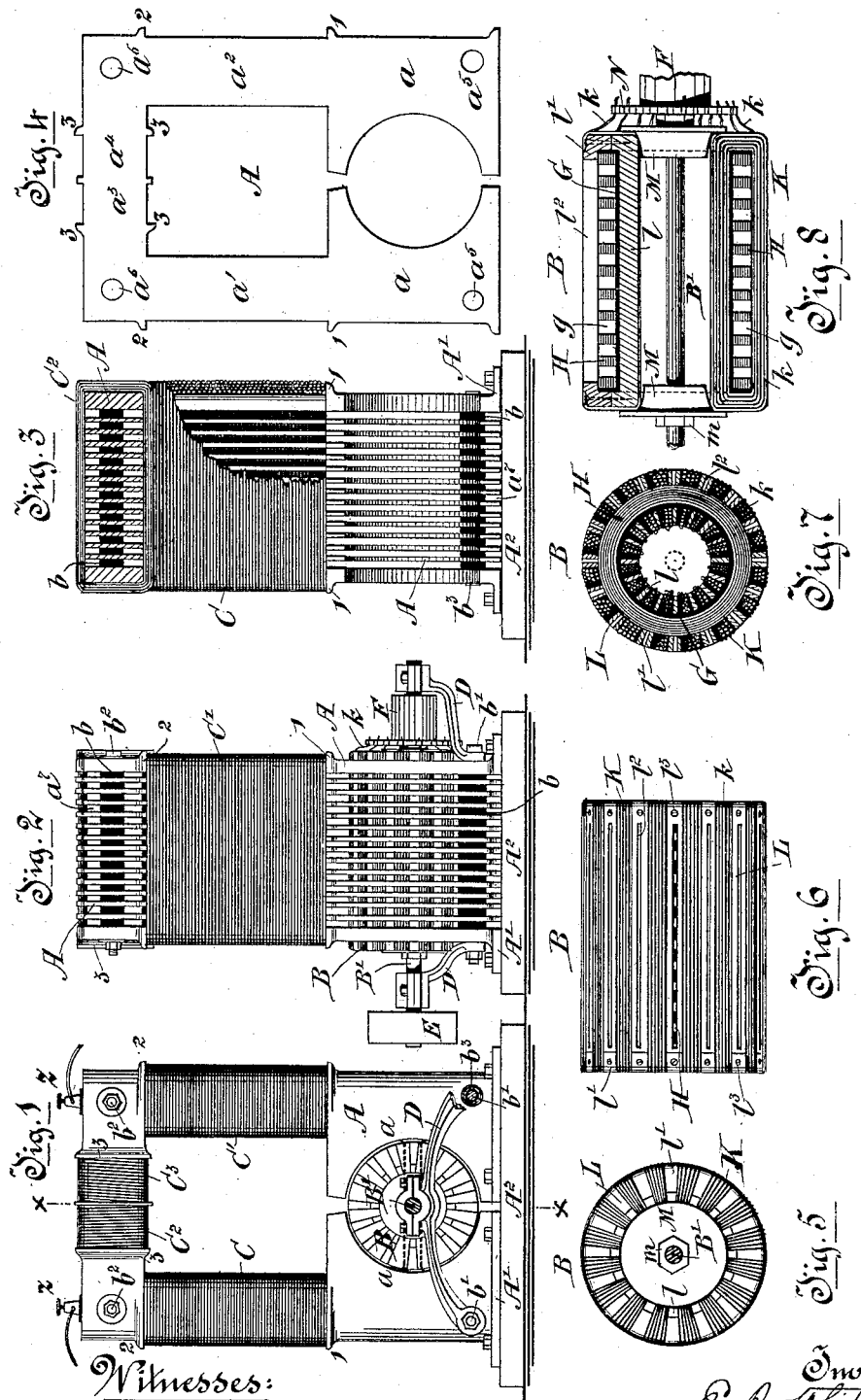

UNITED STATES PATENT OFFICE.

EDWIN R. WHITNEY, OF MANCHESTER, NEW HAMPSHIRE, ASSIGNOR TO SAMUEL CALDWELL FORSAITH AND WILLIAM ELLERY DREW, BOTH OF SAME PLACE.

DYNAMO-ELECTRIC MACHINE.

SPECIFICATION forming part of Letters Patent No. 322,230, dated July 14, 1885.

Application filed March 31, 1885. (No model.)

*To all whom it may concern:*

Be it known that I, EDWIN RUTHVEN WHITNEY, of the city of Manchester, in the county of Hillsborough and State of New Hampshire, have invented certain new and useful Improvements in Dynamo-Electric Machines; and I do hereby declare that the following is a full, clear, and exact description of the same.

The object of my invention is to produce a dynamo-electric machine which shall be simple and cheap in construction, capable of being easily and rapidly put together, and one which shall generate the greatest amount of current with the least expenditure of power, besides obviating the danger of short-circuiting from burning of the insulating material arising from the extreme heat induced by the operation.

My improvements relate, mainly, to the construction of the field-magnets and armature, for full comprehension of which reference must be had to the accompanying drawings, in which letters similar to those used in the following detailed description indicate like parts.

Figure 1 is a side elevation of my improved dynamo-electric machine; Fig. 2, an end view of same; Fig. 3, a vertical section taken on line $x\ x$, Fig. 1; Fig. 4, a plan of one of the plates or sections going to make up my integral field-magnet cores and poles; Fig. 5, an end view of armature; Fig. 6 a side elevation, Fig. 7 a cross-section, and Fig. 8 a longitudinal section, of same.

A A are a number of flat plates or sections made, preferably, of cast-iron and of somewhat the shape shown—*i. e.*, each embodying in one piece an integral part of the poles and cores of the field-magnets, $a\ a$ representing the poles between which the armature B revolves, and $a'$, $a^2$, $a^3$, and $a^4$ those parts which form the core of the field-magnets C, C', $C^2$, and $C^3$. All the plates A A are perforated near their four principal corners, as shown at $a^5\ a^5\ a^6\ a^6$, and a sufficient number (according to the length of the armature) of these plates are put together with insulating blocks or washers $b\ b$ of asbestus or other suitable material between them, preferably at the holes $a^5\ a^6$, as shown, so as to completely insulate and separate one from the other and leave air-spaces $a^7\ a^7$ between said plates throughout.

Bolts $b'\ b'\ b^2\ b^2$ are employed to hold the plates and insulating-washers together, and these bolts will run through insulating-tubes $b^3\ b^3$, which are first inserted in the holes.

The wire of the field-magnets is wound around the plates thus put together at the parts $a'$, $a^2$, $a^3$, and $a^4$, respectively, and said magnets are connected with each other and with the binding-posts $z\ z$ in the usual way understood by electricians.

To facilitate the winding of the magnets and prevent cutting of the insulated wire, as well as to improve the appearance of the machine, I make the two outer plates slightly convex on their faces, and suitable flanges or lips, 1 1 2 2 3 3, are formed on the plates, or on such of them as may be necessary, in order to make the coils of wire compact and secure. The outer plates may also, if found desirable, have base-flanges A' A' to facilitate fastening of the machine to a bed-plate, $A^2$, or other means may be employed for the purpose.

The armature B is mounted on a suitable shaft, B', and this shaft is journaled in standards D D, which may either be carried by the bolts $b'\ b'$, as shown in Fig. 1, or cast in one with the outside plates, as indicated by dotted lines. In both cases suitable brasses will be used, and either arrangement does away with the necessity of a true and permanent bed-plate.

E is the driving-pulley, and F the commutator of any approved construction.

My improved armature is constructed as follows: G is an open-ended iron cylinder of suitable weight, upon which I place a series of rings, H H, of iron, each made up by preference of a number of layers, which can be done by winding continuous strips thereon, these rings being so arranged and fastened on the cylinder G as to leave annular air-spaces $g\ g$ between said rings. The usual insulated wires, $k\ k$, are wound across the cylinder and rings (formed as above) from end to end, inside and outside of said cylinder, but not crossing its open ends, to form the bobbins K, bars L L, of wood or other suitable material, having been by preference previously placed in position to give the necessary separation to the bobbins. These bars L are in two pieces, $l\ l'$, one being placed inside the cylinder G and the other outside on top of the rings H H, lengthwise with said cylinder, and each outside bar— i. e., those marked $l'$—has a wide slot, $l^2$, extending nearly from end to end thereof, and said inside and outside bars are fastened together at their ends clear of the ends of the cylinder by screws or other means, as shown at $l^3\ l^3$.

Upon the armature-shaft B' are slipped two collars, M M, which are forced into the ends of the cylinder, formed as above described, and held firmly therein and on the shaft by nuts $m\ m$, or equivalent means.

The different bobbins are connected by the wires $k\ k$ to the commutator-plates N, or connection to the commutator F may be made in any other approved way.

Suitable collecting-brushes and other necessary attachments will of course be provided for the machine.

It must be seen that by my invention a thoroughly efficient dynamo-electric machine is produced at far less cost than those heretofore invented, the weight of metal being greatly reduced and cost of putting the parts together materially lessened, while the light weight of my armature, combined with the arrangement of "divided-up" poles will minimize the power required to generate the current.

The capacity of my machine will be regulated simply by increasing or diminishing the number of plates in the field-magnets and by changing the length of the armature to correspond.

What I claim is as follows:

1. In a dynamo-electric machine, the poles and cores of the field-magnets formed from a number of integral plates or sections secured together with blocks or washers of non-conducting material so arranged as to insulate each plate from its neighboring plates and leave air-spaces between them, substantially as and for the purposes described.

2. An armature for a dynamo-electric machine, made up of an iron cylinder having a number of separate rings arranged on its periphery with spaces between said rings and bobbins of insulated wire wound lengthwise with said cylinder and across said rings, in combination with a shaft and means for holding said armature thereon, substantially as described.

3. An armature for a dynamo-electric machine, made up of cylinder G, having separate peripheral rings H H arranged thereon, with spaces between said rings, bobbins K K, and separating-bars L, having slots $l^2$, in combination with a shaft and means for holding said armature thereon, substantially as and for the purpose specified.

EDWIN R. WHITNEY.

Witnesses:
GEO. C. CHASE,
W. H. RUSSEL.